US008818991B2

(12) United States Patent
Hagenbuch et al.

(10) Patent No.: US 8,818,991 B2
(45) Date of Patent: Aug. 26, 2014

(54) APPARATUS AND METHOD FOR ANALYZING QUERY OPTIMIZER PERFORMANCE

(75) Inventors: Brian Hagenbuch, Annapolis, MD (US); Sivaramakrishnan Narayanan, Foster City, CA (US); Chad William Whipkey, Foster City, CA (US); Florian Waas, San Mateo, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 758 days.

(21) Appl. No.: 12/646,716

(22) Filed: Dec. 23, 2009

(65) Prior Publication Data

US 2011/0153594 A1    Jun. 23, 2011

(51) Int. Cl.
*G06F 17/30*    (2006.01)

(52) U.S. Cl.
USPC .......................................................... 707/718

(58) Field of Classification Search
USPC ........................................ 707/718; 714/38.14
See application file for complete search history.

(56) References Cited

U.S. PATENT DOCUMENTS

| 4,829,427 | A  | * | 5/1989  | Green .................................. 1/1 |
| 7,139,749 | B2 | * | 11/2006 | Bossman et al. ............... 707/714 |
| 2003/0115212 | A1 | * | 6/2003  | Hornibrook et al. ....... 707/103 R |
| 2006/0004695 | A1 | * | 1/2006  | Day et al. ............................. 707/2 |
| 2006/0004707 | A1 | * | 1/2006  | Dettinger et al. ................... 707/3 |
| 2006/0074970 | A1 |   | 4/2006  | Narayanan et al. |
| 2007/0038898 | A1 | * | 2/2007  | Clee et al. ......................... 714/38 |
| 2007/0061289 | A1 |   | 3/2007  | Brown et al. |
| 2007/0112549 | A1 |   | 5/2007  | Lau et al. |
| 2008/0005281 | A1 |   | 1/2008  | Hsueh et al. |
| 2008/0059492 | A1 |   | 3/2008  | Tarin |
| 2008/0097962 | A1 | * | 4/2008  | Santosuosso ...................... 707/2 |
| 2008/0306973 | A1 | * | 12/2008 | Richard ......................... 707/100 |
| 2009/0100004 | A1 |   | 4/2009  | Andrei et al. |
| 2009/0276394 | A1 |   | 11/2009 | Bestgen et al. |
| 2009/0281985 | A1 | * | 11/2009 | Aggarwal .......................... 707/2 |
| 2010/0325124 | A1 | * | 12/2010 | Wu et al. ........................ 707/759 |

OTHER PUBLICATIONS

International Search Report from corresponding PCT Application No. PCT/US10/60154, dated Jan. 25, 2011 and mailed Feb. 8, 2011.
European Search Report issued in EP Application No. 10839989.0 on Feb. 10, 2014, 8 pages.

* cited by examiner

*Primary Examiner* — Noosha Arjomandi
(74) *Attorney, Agent, or Firm* — Fish & Richardson P.C.

(57) ABSTRACT

A method of analyzing the performance of a query optimizer includes identifying an event trigger. A reproduction object characterizing operational parameters of the customer computer at the time of the event trigger is populated. The reproduction object is transported from the customer computer to a test computer. The reproduction object is analyzed at the test computer to characterize the performance of a query optimizer.

12 Claims, 2 Drawing Sheets

APPARATUS AND METHOD FOR ANALYZING QUERY OPTIMIZER PERFORMANCE

FIELD OF THE INVENTION

This invention relates generally to digital data processing. More particularly, this invention relates to analyzing the performance of a query optimizer.

BACKGROUND OF THE INVENTION

Query optimization involves the translation of a database query into an efficient program or query plan to be executed on data stored in a database. The database query is typically stated in a query language, such as Structured Query Language (SQL), Common Query Language (CQL), or Multidimensional Expressions (MDX), among others, which is converted into one or more possible query plans. A query plan specifies a set of steps that are used to access or modify the data associated with the query. Details, such as how to access a given data relation, in which order to join data relations, sort orders, and so on, may form part of a query plan.

For a given query, a large number of query plans may be generated by varying different constituents of the query plan, such as access paths, join methods, join predicates, and sort orders. A typical data warehouse query may produce several hundreds of millions of possible execution plans. The cost of a query plan can be modeled in terms of various parameters, including, for example, the number of disk accesses and the response time required to fetch data. A query optimizer may evaluate the costs of all possible query plans for a given query and determine the optimal, i.e., most efficient plan for executing the query.

Generally, a query optimizer cannot be accessed directly by a user. Thus, a user has little visibility into the optimization process. Nevertheless, a user can identify sub-optimal performance in any number of forms, including an optimizer process crash, an optimizer producing a query plan that produces erroneous results, an inefficient query plan, or a sub-par plan compared to system operation before a system modification. A lack of access to a query optimizer limits the ability of a user to perform what-if analyses where plans are generated under varying circumstances.

Assessing the performance of a query optimizer involves an understanding of multiple parameters. Typically, a query optimizer user is not willing to provide a query optimizer vendor visibility into the user's system, particularly the user's data. Even if access to data is possible, capturing the right data is difficult. In addition, a user is typically not willing to allow any type of evaluation that interferes with ongoing business processes. Thus, while there is a need to understand query optimizer performance in a deployed system, there are limited opportunities to do so. Accordingly, it would be desirable to provide techniques to assess the performance of a deployed query optimizer.

SUMMARY OF THE INVENTION

A method of analyzing the performance of a query optimizer includes identifying an event trigger. A reproduction object characterizing operational parameters of the customer computer at the time of the event trigger is populated. The reproduction object is transported from the customer computer to a test computer. The reproduction object is analyzed at the test computer to characterize the performance of a query optimizer.

A customer computer has a memory connected to a processor. The memory stores a collection module including instructions to cause the processor to identify an event trigger, populate a reproduction object characterizing operational parameters of the customer computer at the time of the event trigger, and transport the reproduction object from the customer computer to a test computer.

A test computer has a memory connected to a processor. The memory stores an analysis module including instructions to cause the processor to analyze a reproduction object characterizing operational parameters of a customer computer at the time of an event trigger to characterize the performance of a query optimizer of the customer computer.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
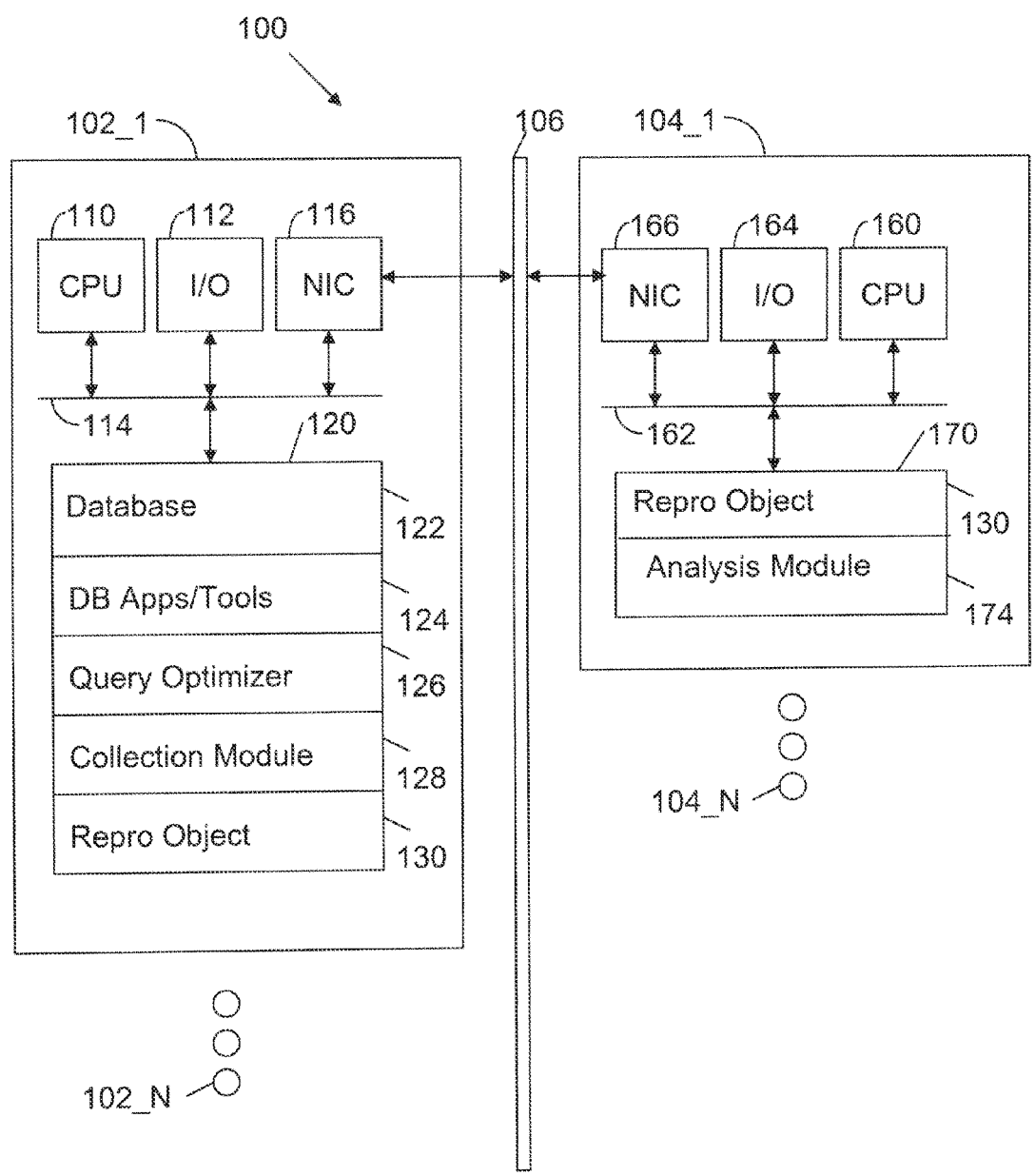
FIG. 1 illustrates a computer system configured in accordance with an embodiment of the invention.

FIG. 1 illustrates a system 100 configured in accordance with an embodiment of the invention. The system 100 includes a customer computer 102_1 and a test computer 104_1 linked by a communication channel 106, which may be any wired or wireless channel. The customer computer 102_1 includes standard components, such as a central processing unit 110 and input/output devices 112 connected via a bus 114. The input/output devices may include a keyboard, mouse, display, printer and the like. Also connected to the bus 114 is a network interface card 116, which provides connectivity to other computers, e.g., computer 104_1. A memory 120 is also connected to the bus 114. The memory stores data and executable modules to implement operations of the invention. In particular, the memory 120 stores a database 122 and an associated set of database applications or tools 124. The database applications or tools 124 are used to construct database queries. Each database query is applied to a query optimizer 126, which develops a query plan, which is applied to the database 122 to produce data results. These components are known in the art.

The invention is directed toward a collection module 128 and a reproduction (repro) object 130. The collection module 128 includes executable instructions to collect query, database and system information under predetermined circumstances. The predetermined circumstances may include an optimization process crash, a traced optimization process, a what-if analysis, and the like. The collection module 128 loads the query, database and system information into a repro object 130. The repro object 130 may then be conveyed to the test computer 104_1. Thus, the collection module 128 may include executable instructions to load and convey the repro object 130.

FIG. 1 illustrates customer computers 102_1 through 102_N. In a typical embodiment, the database 122 and other modules in memory 120 are distributed across many machines. Similarly, test computer 104_1 may be a single machine or its functions may be distributed across a number of machines 104_1 through 104_N.

The test computer 104_1 includes standard components, including a network interface card 166 connected to input/output devices 164 and a central processing unit 160 via a bus 162. A memory 170 is also connected to the bus 162. The memory 170 stores the repro object 130 received from the customer computer 102_1. In addition, the memory 170 stores an analysis module 174, which includes executable instructions to analyze the repro object 130. Any number of analyses may be encoded into the analysis module 174, examples of which are provide below.

Thus, the invention provides a technique for analyzing the performance of a query optimizer. Advantageously, the analysis is performed separate from the customer system and therefore does not disrupt the operation of a deployed customer system. Further, the repro object is configured to provide system information that a customer is willing to share. Advantageously, the repro object need not include actual customer data. Analysis of the repro object is performed separate from the deployed customer system. The results of the analysis may be supplied to the customer along with proposed software fixes. In particular, the analysis module 174 may supply a query optimizer report back to the customer. In some instances, the analysis module 174 provides software patches and/or proposed settings to improve system performance.

Figure 2:
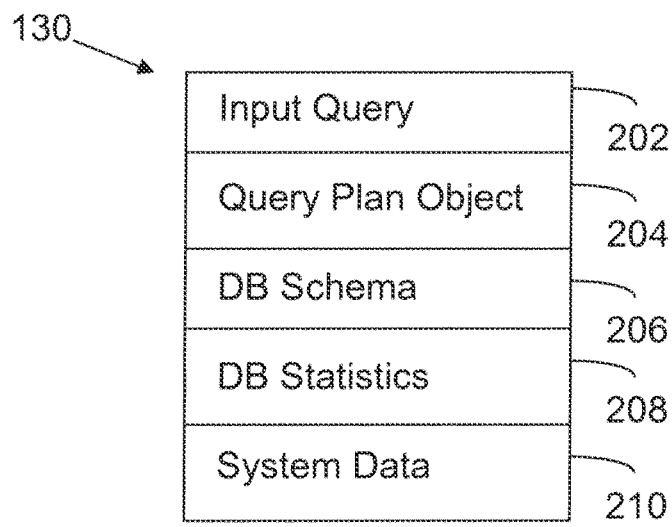
FIG. 2 illustrates a reproduction objection configured in accordance with an embodiment of the invention.

FIG. 2 illustrates one embodiment of a repro object 130. The repro object 130 includes an input query 202, which is the subject of a query optimization process. The input query is a formal expression to retrieve data from a data source.

The repro object 130 also includes a query plan object 204, which is the query plan applied to the database 122 to execute the specified input query 202. That is, the query plan is a set of operations for optimal execution of an input query against a database.

The repro object 130 also includes database schema information 206. The database schema includes at least a characterization of individual tables of a relational database.

The repro object 130 also includes database statistics 208. The database statistics are metrics characterizing entries within a database. Finally, the repro object 130 includes system data 210. The system data 210 includes metrics characterizing the physical machines and the properties of the physical machines that process a query plan object. This data may include the number of machines, available memory, hash aggregation, and the like.

Figure 3:
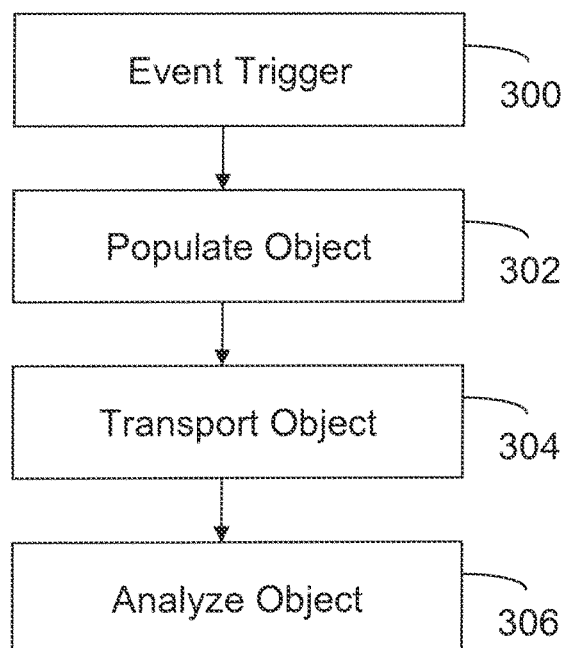
FIG. 3 illustrates processing operations associated with an embodiment of the invention.

FIG. 3 illustrates processing operations associated with an embodiment of the invention. An event trigger is monitored 300. In particular, the collection module 128 monitors an event trigger. The event trigger may be the submission of a specified query, a what-if scenario, a system crash, a request for a repro object or any other pre-defined event. In response to the event trigger, a repro object is populated 302. The repro object is then transported 304. For example, the repro object 130 is transported from a customer computer 102_1 to a test computer 104_1. The repro object is then analyzed 306. For example, the analysis module 174 of test computer 104_1 may be used to analyze the repro object 130.

In one embodiment, the repro object 130 is an eXtendible Markup Language (XML) encoded object defined according to a grammar referred to as Data Exchange Language (DXL). An annotated example of such a repro object is provided in the attached Appendix. Other encodings may also be used in accordance with embodiments of the invention.

In addition to the components shown in FIG. 2, the repro object may include context information, such as configuration parameters, tracing information (e.g., timing information) about the order and results of internal optimization steps, and related information.

Preferably, the repro object is optimized for extensibility to evolve over multiple releases. It is highly desirable that the format is verbose, human readable, and supports standard query languages, e.g., XPath or Xquery to facilitate statistical analysis.

Preferable properties of the repro object format include: versioning for unambiguous identification of software and protocol versions, compression for transfer by email or other mediums, encryption, human-readable, suitable for analysis with standard XML editors, suitable for querying by standard XML query tools, and easy to archive in any database that supports storing XML.

Once triggered, the collection module 128 interrogates all software components of the optimizer and requests a serialization of all relevant data. For example, the query optimizer 126 may include optimization context information, a metadata cache, a parser, and a search module, each of which are interrogated for information. In one embodiment, all components interface using a standard abstract API; each component decides independently what information is relevant. Ideally, any newly added component provides a callback function. Preferably, the collection module 128 does not interfere with the execution of the actual query, i.e., the query is executed or aborted as if the collection module were not operating.

In one embodiment, the syntax for creating the repro object is exposed through SQL or other general configuration mechanisms, e.g., as part of the data access protocol. For example, PostgreSQL (Postges), an open source object-relational database management system, supports changing the configuration through syntax like this:

SET EXPLAIN_DXL=on

This turns on a repro object for all subsequent statements until the configuration is changed:

SET EXPLAIN_DXL=off

The configuration change is independent of the workload, i.e., the syntax of the actual workload does not need to be altered.

Creation of a repro object triggered by an internal event (e.g., a crash) may be invoked by the following:

```
SET EXPLAIN_DXL=on
<offending statement>
SET EXPLAIN_DXL=off.
```

The repro object format facilitates storing/logging the resulting structure into standard logging facilities, such as data center monitoring infrastructure. Using these external facilities, additional post-processing such as mailing the repro object automatically to the test computer 104_1 (e.g., vendor's support department) becomes possible.

The analysis module 174 may be implemented as a stand-alone optimizer process of matching or comparable software version. A loader mechanism reads the repro object and starts replaying the optimization from which the repro object was taken. It initiates the replay by sending the original query representation to the parser. Optionally, components in the optimizer can be primed with information from the repro object, such as optimization context and metadata cache information. During the replay of an optimization, different optimizer components may request additional information using the standard callback mechanism that would import this information from other database processes, e.g., optimization context information or metadata. The loader intercepts these requests and answers them with information extracted from the repro object.

The interceptor mechanism decouples the optimization on which the optimization is being replayed from other database processes. This makes it possible to replay an optimization in isolation without requiring access to the database system, including replaying on a different hardware platform (different hardware configuration, different operating system, etc.).

The analysis module 174 may include executable instructions to support any number of repro object analyses. For example, the analysis module 174 may include executable instructions to analyze a query optimizer crash. In this case, the optimizer crashes during optimization of a SQL statement due to a software defect. The internal error handling mechanism kicks in and automatically activates collecting and dumping of the repro object. The repro object is mailed to the test computer 104_1. The resulting repro object can be used to reproduce the incident on a separate copy of the optimizer of the same software version. The problem can be troubleshot without having engineers accessing the production system and requiring downtime. The engineering department develops a fix and verifies the fix conclusively before delivery to the customer. In one embodiment, the repro object provides a complete and fully self-contained regression test that can be incorporated into the regular daily regression tests of the development department.

The analysis module 174 may also be encoded to assess a suboptimal query plan. In this scenario, a customer observes unexpected query behavior, e.g., unexpectedly slow execution, which may be attributable to a suboptimal plan. Understanding such changes in behavior is non-trivial and very often not indicative of a software defect, but is simply due to significant changes in the user data. The user generates a repro object using a syntax extension. The repro object is delivered to the analysis module 174 of the test computer 104_1. The analysis module 174 can evaluate the perceived defect.

The analysis module 174 may also be encoded with executable instructions to evaluate an incorrect plan. In this case, a customer notices wrong results when executing a specific query. The customer explicitly requests a repro object using a syntax extension. The repro object is delivered to the analysis module 174 of the test machine 104_1. The analysis module 174 investigates the cause and discerns whether there is an optimizer defect or wrong results are due to faulty execution of a correct query plan. In the case of an optimizer defect, the optimizer crash workflow discussed above may be invoked. In the case of an execution defect, traditional troubleshooting techniques may be applied.

The analysis module 174 may also be implemented to support workflow monitoring or recording. Typical workflows consist of several hundreds of queries run at regular intervals. Usually a small subset of 'important' queries is considered performance critical. After tuning the system, a user generates repro objects for the critical queries and archives them (e.g., stores them in the database). In the event that plan regressions occur (performance degradation of queries) after upgrades of the database software, a user can compare a new repro object with an archived repro object and determine if performance degradation is due to software regressions.

The analysis module 174 may also be implemented to support what-if analyses. For tuning purposes, it is extremely helpful to understand which database objects are being used in what ways and how frequently. The original query text contains references to database objects like tables, but the optimizer makes decisions regarding additional object references, such as indexes. To tune a system properly it is necessary to understand the precise referencing of these objects. Users can record a workflow and archive the resulting repro objects in the database. Thereafter, the data can be queried to determine certain characteristics of objects. Examples include: rank indexes by their usefulness, determine what columns are frequently used in equality predicates in order to create indices on them, and identify tuning opportunities based on queries over recorded workflows. What-if scenarios may also be implemented by changing environment settings, such as adding memory, adding machines, and the like.

Those skilled in the art will recognize a number of advantages associated with the invention. The repro object allows one to "replay" a problem and analyze it. For example, when a software defect is identified, the repro object can be used to develop a workaround as a stop-gap measure or to aid in developing a fix of the optimizer code and verify the fix before release to a customer. The repro object captures critical test cases for regression testing once a fix has been developed. The repro object is self-contained and generated without manual intervention, hence, eliminating administrative error. The repro object may be augmented during optimization if the optimizer requests additional metadata for the system. While a repro object is typically created in response to a triggered event, it may also be generated synthetically to create test cases. Repro objects can be stored and analyzed for statistical purposes, for example, to detect correlations between query or schema features and crashes or suboptimal results.

An error report provides a snapshot of information at the time of a system fault or crash. Such a report may suffice for a simple process, such as a single application operating on a single machine. On the other hand, such a tool is not very helpful in a sophisticated application or applications operating on many machines. In such a context, a variety of system parameters need to be tracked over time. As shown with the exemplary repro object below, system parameters are tracked over time, not simply at the time of a system crash. Thus, the repro object is not merely useful for fault detection, it is also well suited for optimization runs (i.e., no system crash is involved, but results appear to be sub-optimal).

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

APPENDIX

```
<r:optimizer-repro version="1.0" database-software-version="3.4.0"
xmlns:r="http://greenplum.com/dx1/2010/03/">
    <!--***********************************
        Input SQL object; the repro object captures the original input query, as shown below
        ***********************************-->
    <r:sql>
        select length(c2.name), sum(sales.quantity)
        from customer as c2 inner join sales on sales.customer_id = c2.id
        where c2.name like 'Bob%' and
            sales.saledate > '2008-03-04' and
            sales.saledate < '2009-01-01'
    </r:sql>
    <!--***********************************
        Query object; the repro object captures the query plan selected by the query optimizer,
as shown below
        ***********************************-->
    <r:query>
        <r:project relation-name="result">
            <r:projection-columns>
                <r:colref target="gb.name_length"/>
                <r:colref target="gb.quantity"/>
            </r:projection-columns>
            <r:group-by relation-name="gb">
                <r:group-by-columns>
                    <r:function-call attribute-name="name_length" name="length" output-type="int4">
                        <r:colref target="customer.name"/>
                    </r:function-call>
                </r:group-by-columns>
                <r:aggregate-columns>
                    <r:sum attribute-name="quantity">
                        <r:colref target="sales.quantity"/>
                    </r:sum>
                </r:aggregate-columns>
                <r:inner-join relation-name="ij">
                    <r:left>
                        <r:subquery relation-name="c2" alias="c2">
                            <r:get table-name="customer" relation-name="customer">
                                <r:columns>
                                    <r:column name="name" attribute-name="name"/>
                                    <r:column name="id" attribute-name="id"/>
                                    <r:column name="birthdate" attribute-name="birthdate"/>
                                </r:columns>
                                <r:filter>
                                    <r:like>
                                        <r:colref target="customer.name"/>
                                        <r:constant type="varchar" value="Bob%"/>
                                    </r:like>
                                </r:filter>
                            </r:get>
                        </r:subquery>
                    </r:left>
                    <r:right>
                        <r:get table-name="sales" relation-name="sales" table-alias="sales">
                            <r:columns>
                                <r:column name="customer_id" attribute-name="customer_id"/>
                                <r:column name="quantity" attribute-name="quantity"/>
                                <r:column name="saledate" attribute-name="saledate"/>
                            </r:columns>
                            <r:filter>
                                <r:and>
                                    <r:greater-than>
                                        <r:colref target="sales.saledate"/>
                                        <r:constant type="date" value="2008-03-04"/>
                                    </r:greater-than>
                                    <r:less-than>
                                        <r:colref target="sales.saledate"/>
                                        <r:constant type="date" value="2009-01-01"/>
```

APPENDIX-continued

```
                    </r:less-than>
                </r:and>
            </r:filter>
        </r:get>
    </r:right>
    <r:join-expression>
        <r:equals>
            <r:colref target="sales.customer_id"/>
            <r:colref target="c2.id"/>
        </r:equals>
    </r:join-expression>
  </r:inner-join>
 </r:group-by>
 </r:project>
</r:query>
<!--********************************
    Schema data; the repro object collects information on the database schema, including,
in this example, table names, column names and column attributes
    ********************************-->
<r:schema>
    <r:table name="customer">
        <r:columns>
            <r:column name="id" type="int4" is-nullable="false" />
            <r:column name="name" type="varchar(100)" is-nullable="false" />
            <r:column name="birthdate" type="date" is-nullable="true" />
            <r:column name="address_street_1" type="varchar(200)" is-nullable="true" />
            <r:column name="address_street_2" type="varchar(200)" is-nullable="true" />
            <r:column name="address_city" type="varchar(100)" is-nullable="true" />
            <r:column name="address_zip" type="varchar(10)" is-nullable="true" />
        </r:columns>
    </r:table>
    <r:table table-name="sales">
        <r:columns>
            <r:column name="customer_id" type="int4" is-nullable="false" />
            <r:column name="quantity" type="int2" is-nullable="false" />
            <r:column name="saledate" type="date" is-nullable="false" />
        </r:columns>
    </r:table>
</r:schema>
<!--********************************
    Statistics data; the repro object characterizes database statistics or metrics
characterizing entries within a relational database, including, in this example, such metrics
as table name, number of rows, average row width, number of values, etc.; observe that
statistics are gathered over periods of time (histogram-buckets) and therefore can be used to
evaluate a set of circumstances preceding a trigger event
    ********************************-->
<r:statistics>
    <r:table-statistics name="customer" num-rows="444444" average-row-width="450"/>
    <r:table-statistics name="sales" num-rows="12345678" average-row-width="40"/>
    <r:column-statistics name="customer" column="name" num-distinct-values="123456">
        <r:histogram>
            <r:histogram-bucket start="Aardvark" end="Frank" estimated-num-values="98592"/>
            <r:histogram-bucket start="Frank" end="Moe" estimated-num-values="105134"/>
            <r:histogram-bucket start="Moe" end="Roger" estimated-num-values="99287"/>
            <r:histogram-bucket start="Roger" end="Zydrunas" estimated-num-values="99783"/>
        </r:histogram>
    </r:column-statistics>
    <r:column-statistics name="sales" column="saledate" num-distinct-values="2190">
        <r:histogram>
            <r:histogram-bucket start="2000-01-01" end="2000-07-01" estimated-num-values="1010101"/>
            <r:histogram-bucket start="2000-07-01" end="2001-01-01" estimated-num-values="1143948"/>
            <r:histogram-bucket start="2001-01-01" end="2001-07-01" estimated-num-values="991235"/>
            <r:histogram-bucket start="2001-07-01" end="2002-01-01" estimated-num-values="1000000"/>
            <r:histogram-bucket start="2002-01-01" end="2002-07-01" estimated-num-values="991235"/>
            <r:histogram-bucket start="2002-07-01" end="2003-01-01" estimated-num-values="1008348"/>
            <r:histogram-bucket start="2003-01-01" end="2003-07-01" estimated-num-values="1093589"/>
            <r:histogram-bucket start="2003-07-01" end="2004-01-01" estimated-num-values="990213"/>
            <r:histogram-bucket start="2004-01-01" end="2004-07-01" estimated-num-values="998965"/>
            <r:histogram-bucket start="2004-07-01" end="2005-01-01" estimated-num-
```

APPENDIX-continued

```
values="996352"/>
            <r:histogram-bucket start="2005-01-01" end="2005-07-01" estimated-num-
values="1103847"/>
            <r:histogram-bucket start="2005-07-01" end="2006-01-01" estimated-num-
values="993544"/>
        </r:histogram>
      </r:column-statistics>
    </r:statistics>
<!--**********************************
     Environment settings; the repro object collects system data or metrics characterizing
the physical machines and the properties of the physical machines that process a query plan
object; in this example, the repro object characterizes the number of machines, the available
memory and Boolean variables such as hash aggregation, index scan and nested loop join
           **********************************-->
    <r:environment>
        <r:setting name="number-machines" value="15"/>
        <r:setting name="work-memory-available" value="32MB"/>
        <r:setting name="enable-hash-aggregation" value="true"/>
        <r:setting name="enable-index-scan" value="false"/>
        <r:setting name="enable-nested-loop-join" value="true"/>
    </r:environment>
</r:optimizer-repro>
```

The invention claimed is:

1. A method of analyzing the performance of a query optimizer, comprising:
interrogating in response to an event trigger software components of a query optimizer of a customer computer to collect serialized data, said event trigger being selected from a query optimizer crash, the submission of a specified query, and a request for a reproduction object;
populating at the customer computer a reproduction object characterizing operational parameters of the customer computer at the time of the event trigger, the operational parameters comprising said serialized data, query and database information, and system information characterizing physical machines that process a query execution plan object, the operational parameters further including an input query, a query plan object, database schema information, database statistics and physical machine data;
transporting the reproduction object from the customer computer to a test computer; and
analyzing the reproduction object at the test computer to characterize the performance of the query optimizer.

2. The method of claim 1 wherein analyzing includes analyzing a query optimizer crash.

3. The method of claim 1 wherein analyzing includes analyzing a suboptimal query plan.

4. The method of claim 1 wherein analyzing includes analyzing an incorrect query plan.

5. The method of claim 1 wherein analyzing includes analyzing a query optimization workflow.

6. The method of claim 1 wherein analyzing includes performing a what-if scenario.

7. A customer computer, comprising:
a processor; and
a memory connected to the processor, the memory storing a collection module including instructions to cause the processor to:
interrogate in response to an event trigger software components of a query optimizer of the customer computer to collect serialized data,
populate a reproduction object characterizing operational parameters of the customer computer at the time of the event trigger, the operational parameters comprising said serialized data, query and database information, and system information characterizing physical machines that process a query execution plan object, and
transport the reproduction object from the customer computer to a test computer for query optimizer performance analysis, wherein the event trigger is selected from a query optimizer crash, the submission of a specified query and a request for a reproduction object, and the operational parameters include an input query, a query plan object, database schema information, database statistics and physical machine data.

8. A test computer, comprising:
a processor; and
a memory connected to the processor, the memory storing an analysis module including instructions to cause the processor to:
analyze a reproduction object characterizing operational parameters of a customer computer at the time of an event trigger to characterize the performance of a query optimizer of the customer computer, the operational parameters comprising serialized data from software components of said query optimizer, query and database information, and system information characterizing physical machines that process a query execution plan object, and wherein the operational parameters further include an input query, a query plan object, database schema information, database statistics and physical machine data, and wherein said event trigger includes a query optimizer crash.

9. The test computer of claim 8 wherein the executable instructions to analyze include executable instructions to analyze a suboptimal query plan.

10. The test computer of claim 8 wherein the executable instructions to analyze include executable instructions to analyze an incorrect query plan.

11. The test computer of claim 8 wherein the executable instructions to analyze include executable instructions to analyze a query optimization workflow.

12. The test computer of claim 8 wherein the executable instructions to analyze include executable instructions to analyze a what-if scenario.

* * * * *